United States Patent Office 3,497,541
Patented Feb. 24, 1970

3,497,541
UREA DERIVATIVES
Henry Martin, Basel, Hans Aebi, Riehen, and Ludwig Ebner, Stein, Aargau, Switzerland, assignors to Ciba Limited, Basel, Switzerland
No Drawing. Continuation-in-part of application Ser. No. 191,442, May 1, 1962. This application Apr. 19, 1966, Ser. No. 543,541
Claims priority, application Switzerland, May 6, 1961, 5,336/61
Int. Cl. C07c; A01n 9/20
U.S. Cl. 260—453                          2 Claims

ABSTRACT OF THE DISCLOSURE

New compounds are provided which may be represented by the formula

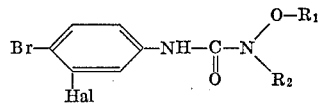

wherein Hal represents either bromine or chlorine and $R_1$ and $R_2$ represent lower alkyl.

The compounds of this invention are especially useful as herbicides, fungicides and nematocides.

---

This is a continuation-in-part application of our copending application Ser. No. 191,442, filed May 1, 1962, now U.S. Patent 3,288,851.

The present invention relates to new compounds of the general formula

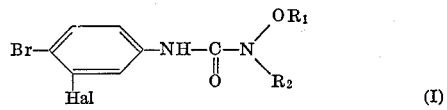 (I)

wherein Hal represents a halogen atom, more particularly a bromine or chlorine atom and $R_1$ and $R_2$ each represents a lower alkyl radical.

As a preferred embodiment the present invention relates to the compound of the formula

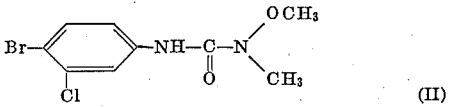 (II)

The above compounds are excellent agents for combating weeds and, depending on the concentration at which they are used, they can be used as herbicides having a total or selective action. Furthermore, the compounds of the Formulae I and II set forth above are very active against harmful nematodes and micro-organisms, more especially fungi, such as phytopathogenic fungi.

The compounds of the general Formula I are prepared by treating a compound of the general formula

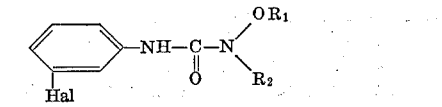

wherein Hal, $R_1$ and $R_2$ have the meaning set forth above in Formula I, with a brominating agent. This process has the advantage that it leads to the production of the valuable compounds of the general Formula I in an especially simple and economical manner. The smooth and unitary course of the reaction could not be foreseen, since the starting materials to be brominated contain other reactive groups, for example, the

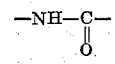

group into which the bromine might be expected to enter.

As starting material to be brominated by this process there is especially to be mentioned the compound of the formula

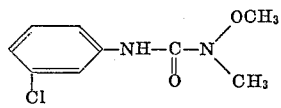

The bromination of the starting compounds may be carried out in the presence or absence of water.

The urea derivatives used as starting materials are advantageously brominated in the presence of a solvent or dispersing medium in which they are dissolved or suspended and, if desired, in the presence of an agent capable of binding acid, for example, sodium acetate.

As solvents or dispersing media for the starting materials to be brominated there may be used, for example, glacial acetic acid, chloroform, carbon tetrachloride, nitrobenzene, sulfuric acid, water or pyridine.

The bromination may be carried out with bromine itself or with a compound yielding bromine. There may be used organic and inorganic compounds containing bromine that are known to be suitable for brominating organic substances and compounds which yield bromine of their own accord or liberate bromine during the reaction. Examples are: hypobromous acid or salts thereof, especially alkali metal salts or alkaline earth metal salts, such as sodium hypobromite or calcium hypobromite, organic compounds that yield bromine, such as N-bromocarboxylic acid amides or imides, especially N-bromosuccinimide, addition compounds of bromine with organic compounds, for example with pyridine, such as pyridine dibromide and similar brominating agents. The bromination is advantageously carried out at temperatures between 60° C. and 100° C., preferably at temperatures between 65 and 80° C.

The invention also provides preparations for combating undesirable plant growth and pests, more particularly harmful nematodes, microorganisms such as fungi, which comprise as an active substance a compound of the above general formula, and an inert carrier, a solvent, a diluent, an emulsifier, a dispersing agent, a wetting agent, an adhesive agent, a fertilizer, or another fungicide, bactericide, a nematocide, or an insecticide, or another herbicide or a molluscicide.

Among the aforesaid preparations those which are specially suitable as pesticides or herbicides are those which contain as active substance the compound of the formula

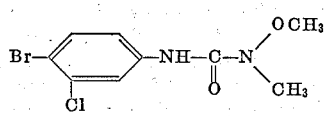

The active substances may be used in an emulsified, dispersed or dissolved form or in a dusting preparation.

For preparing solutions suitable for spraying as such there may be used, for example, organic solvents boiling above 100° C., e.g. mineral oil fractions boiling above 100° C., such as diesel oil or kerosene, or coal tar oils or oils of vegetable or animal origin, or hydrocarbons, such as alkylated naphthalenes, tetra-hydronaphthalene, if desired, with the use of xylene mixtures, cyclohexanols, ketones, or chlorinated hydrocarbons, such as tetrachlorethane, trichlorethylene or tri- or tetra-chlorobenzenes.

As preparations that can be diluted with water to yield aqueous liquors for application as such there may be mentioned emulsion concentrates, pastes or wettable powders. As emulsifying or dispersing agents there are used nonionic products, such as condensation products of aliphatic alcohols, amines or carboxylic acids containing a hydrocarbon radical having 10 to 30 carbon atoms with ethylene oxide, such as a condensation product of octadecyl alcohol with 25 to 30 mols of ethylene oxide or of soya bean oil fatty acid with 30 mols of ethylene oxide or of commercial oleylamine with 15 mols of ethylene oxide or of dodecyl mercaptan with 12 mols of ethylene oxide. As anionic emulsifying agents there may be mentioned the sodium salt of dodecyl alcohol sulfuric acid ester, the sodium salt of dodecyl-benzene sulfonic acid, the potassium or triethanolamine salt of oleic acid or of abietic acid or of a mixture of these acids, or the sodium salt of a petroleum sulfonic acid. As cationic dispersing agents there may be used quaternary ammonium compounds, such as cetyl-pyridinium bromide or dihydroxyethyl-benzyl-dodecyl-ammonium chloride.

As solid carriers for making dusting or strewing powders there may be used talcum, kaolin, bentonite, calcium carbonate or calcium phosphate, or carbon cork meal or wood meal or other materials of vegetable origin. It is very advantageous to make up the preparations in a granulated form. The preparations in their various forms may also have incorporated therewith in the usual manner substances that improve their dispersibility, adhesion, resistance to rain or penetrating power, such as fatty acids, resins, glue, casein or, for example, alginates. The preparations that have a selective action may also be used in conjunction with, for example, in admixture with a fertilizer.

EXAMPLE 1

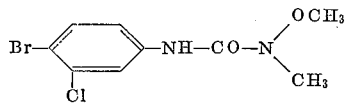

107 grams of N-(3-chloro-phenyl) - N' - methoxy - N'-methyl-urea are dissolved in 500 cc. of glacial acetic acid, 41 grams of anhydrous sodium acetate are added, and the bromination is carried out at 80° C. with 80 grams $Br_2$ dissolved in glacial acetic acid. After 1 hour at 80°, the mixture is poured into ice.

The yield of crude N-(4-bromo-3-chlorophenyl) - N'-methyl-N'-methoxy-urea is 121 grams. The product melts at 94–96° C. after recrystallization from acetonitrile, melts at 94.5 to 95.5° C.

Analysis.—$C_9H_{10}O_2N_2BrCl$: Calculated for C, 36.82; H, 3.43. Found: C, 36.9; H, 3.3.

EXAMPLE 2

(a) To 10 parts of the compound of the above Example 1 are added 2 parts of sulfite cellulose waste liquor and 100 cc. of water, and the mixture is then subjected to intense grinding, to yield a stable dispersion of fine particle size which may be diluted as required with water.

(b) To 50 parts of the compound of Example 1 are added 40 parts of kaolin (*Bolus alba*), 3.5 parts of a condensation product of 1 mol of para-tertiary octylphenol with 8 mols of ethylene oxide, 1.5 parts of heptadecenyl-benzimidazole sulfonate and 5 parts of finely divided $SiO_2$; the mixture is then subjected to intense grinding, to yield a stable dispersion of fine particle size which may be diluted as required with water.

EXAMPLE 3

(a) An aqueous dilution of the dispersion according to Example 2(b) was applied as a spray to a field planted with Irish potatoes (variety: "Red Pontiac") at the rates of 1.5 and 3 pounds of active substance per acre, 2 days after the planting of the potatoes.

The following weeds were present in the test field:

| Common name: | Scientific name |
|---|---|
| Goosegrass | *Eleusine indica*. |
| Crabgrass | *Digitaria sanguinalis*. |
| Pangolagrass | *Digitaria decumbens*. |
| Bermudagrass | *Cynodon dactylon*. |
| Bahiagrass | *Paspalum notatum*. |
| Pokeweed | *Phytolacca americana*. |

At the weed evaluation 2 months after the treatment, all the weeds present in the test field were completely or almost completed killed. There was no phytotoxicity observed on the potatoes treated. At the yield evaluation 3 months after the planting date there was observed that the test field treated according to the invention yielded at least ⅓ more potatoes than an untreated control field. Good selective herbicidal effects were also obtained according to the method described in this example with an application rate of 0.5 pound of active substance per acre.

EXAMPLE 4

Aqueous dilutions of the dispersion according to Example 2(b) were applied as sprays at rates decreasing from 8 to 0.25 pounds of active substance per acre to cultures of rice plants (paddy rice) in the following manner:

(1) Pre-plant soil incorporation. (Harrowed into the soil two days before the rice was sown.)

(2) Preemergent application. (Spraying of the field 1 day after the sowing of the rice.)

Evaluation

In the case of (1): 7 weeks after the treatment
In the case of (2): 7 weeks after the treatment Results At the time of the evaluation an untreated control field was heavily infested with junglerice (Panicum) as the only weed present. In the case of the test fields treated according to the methods (1) and (2) set forth above, it was observed that at the rate of 0.5 pound per acre of active substance the rice cultures were completely freed from the junglerice.

EXAMPLE 5

An aqueous dilution of the dispersion according to Example 2(b) was applied as a spray to a field sown with corn at a rate of 0.5 pound of active substance per acre, 2 days after the sowing of the corn.

At the weed evaluation, 4 weeks after the treatment, it was observed that the following weeds which had been predominant in the treated field, were completely killed: Lovegrass, crabgrass and pigweed. There was no phytotoxicity observed on the treated corn.

EXAMPLE 6

An aqueous dilution of the dispersion according to Example 2(b) was applied as a spray to a field sown with cotton at a rate of 0.5 pound of active substance per acre, 2 days after the sowing of cotton plants.

At the weed evaluation, 4 weeks after the treatment, it was observed that the following weeds which had been predominant in the treated field, were completely killed: Lovegrass, crabgrass and pigweed. There was no phytotoxicity observed on the treated cotton plants.

EXAMPLE 7

Aqueous dilutions of the dispersion according to Example 2(b) were applied as sprays at rates decreasing from 4 to 1 pound of active substance per acre by pre-plant soil incorporation to tomatoes (harrowed into the soil two days before the tomatoes were planted).

At the evaluation 4 weeks after the treatment of the soil it was observed that the following weeds present in the cultures were killed as a result of the treatment at a rate of 1.0 pound of active substance per acre: Dock, whiteclover and pepperweed. No phytotoxicity was observed in the tomatoes.

EXAMPLE 8

An aqueous dilution of the dispersion according to Example 2(b) was applied as a spray to a field sown with peanuts at a rate of 0.5 pound of active substance per acre, 2 days after the sowing of peanuts.

At the weed evaluation, 4 weeks after the treatment, it was observed that the following weeds which had been predominant in the treated field, were completely killed: Lovegrass, crabgrass and pigweed. There was no phytotoxicity observed in the treated peanut culture.

EXAMPLE 9

(a) Aqueous dilutions of the dispersion according to Example 2(b) were applied as sprays at rates of 0.75 and 1.5 pounds of active substance per acre to cultures of carrots, 2 weeks after the crops had been sown. At the evaluation 4 weeks after the treatment, it was observed that the following weeds which had been predominant in the treated test field, were practically completely killed: Lambsquarter, ragweed and smartweed. No phytotoxic effects on the treated carrots were observed.

(b) An equally good selective effect was observed by applying the active compound under the conditions set forth above under (a) to a culture of peas.

EXAMPLE 10

An aqueous dilution of the dispersion according to Example 2(b) was applied as a spray to 2 test fields sown with lima beans and soybeans, respectively at a rate of 0.5 pound of active substance per acre, 2 days after the sowing of said plants.

At the weed evaluation, 4 weeks after the treatment, it was observed that the following weeds which had been predominant in the treated fields, were completely killed: Lovegrass, crabgrass and pigweed. There was no phytotoxicity observed in the treated crop plants.

EXAMPLE 11

Microbicidal effects (a) From the compound described in Example 1 a solution of 1 percent by weight in propylene glycol was prepared and tested against harmful fungi as described below:

(b) The following test-organism was used: *Rhizopus nigricans*. An aqueous beerwort solution of 10% strength was used as nutrient medium of which 9.5 ml. were put into a test-tube. 0.5 ml. of the solution set forth above under (a) was added to the 9.5 ml. of nutrient medium. In this way a solution was obtained containing 500 p.p.m. of active substance. This was diluted with beerwort solution to a concentration of active substance of 60 p.p.m. The resulting solution was inoculated with 1 drop of a spore suspension of the above mentioned test organisms, and incubated for 8 days at 24° C. It was then determined whether or not any growth of the test organism could be observed. The result is shown in the following table:

Test organism _____ *Rhizopus nigricans*
Limit concentration at which inhibition of growth occurs _____ 60 p.p.m The effective amount of active compound set forth above did not cause any phytotoxic effects on test plants treated with them, e.g. celery plants.

(c) As a comparative test the following compound was tested under exactly the same conditions as set forth above under (a) and (b):

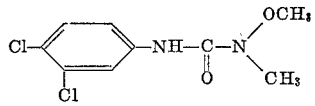

In the case of this compound, however, no fungicidal effect could be observed, i.e., the test solution was completely overgrown by the test organism.

EXAMPLE 12

Nematocidal effect 10 g. of the active substance described in Example 1 was dissolved in 100 g. of acetone, and 80 g. of an emulsifier, consisting of the condensation product from 1 mol of para-di-tertiary octylphenol with 8 mols of ethylene oxide, are added to the solution. The resulting concentrate may be diluted with water ad libitum, for example to a concentration of 2.5 p.p.m.

What is claimed is:

1. A compound of the formula

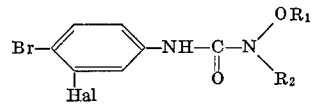

wherein Hal is chlorine and $R_1$ and $R_2$ each represents lower alkyl.

2. The compound of the formula

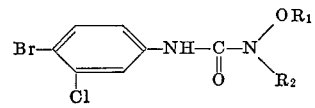

wherein $R_1$ and $R_2$ each represents methyl.

References Cited

UNITED STATES PATENTS 3,288,586  11/1966  Littler _____ 260—453 XR

FOREIGN PATENTS 973,354  10/1964  Great Britain.

JOSEPH P. BRUST, Primary Examiner

U.S. Cl. X.R.

260—694; 71—120; 424—322